(12) United States Patent
Tsuchiya et al.

(10) Patent No.: US 6,999,244 B2
(45) Date of Patent: *Feb. 14, 2006

(54) IMAGE PICKUP APPARATUS (75) Inventors: Shouji Tsuchiya, Aichi (JP); Toshiaki Ueda, Saitama (JP); Naoshi Hirata, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/081,634

(22) Filed: Mar. 17, 2005

(65) Prior Publication Data

US 2005/0157201 A1      Jul. 21, 2005

Related U.S. Application Data

(63) Continuation of application No. 10/827,336, filed on Apr. 20, 2004, now Pat. No. 6,906,870.

(30) Foreign Application Priority Data

May 7, 2003 (JP) .............................. 2003-128543

(51) Int. Cl.
*G02B 15/14* (2006.01)

(52) U.S. Cl. ..................................................... 359/694
(58) Field of Classification Search ................ 359/694, 359/697, 701, 704; 396/439, 529
See application file for complete search history.

(56) References Cited

U.S. PATENT DOCUMENTS

| 5,521,036 | A | 5/1996 | Iwamoto et al. |
| 6,046,863 | A | 4/2000 | Chino |
| 6,081,371 | A | 6/2000 | Shioda et al. |
| 6,661,585 | B2 | 12/2003 | Okawara |
| 6,831,793 | B2 | 12/2004 | Nakamura |
| 2002/0171815 | A1 | 11/2002 | Matsuyama et al. |
| 2004/0042089 | A1 | 3/2004 | Nomura |
| 2004/0061799 | A1 | 4/2004 | Atarashi et al. |
| 2004/0174614 | A1 | 9/2004 | Hovanky |
| 2004/0227845 | A1 | 11/2004 | Kawai |

FOREIGN PATENT DOCUMENTS

EP       0 811 874       12/1997

OTHER PUBLICATIONS

Patent Abstracts of Japan, JP 2000-330179, Nov. 30, 2000.
Patent Abstracts of Japan, JP 2001-051332, Feb. 23, 2001.
Patent Abstracts of Japan, JP 07-092537, Apr. 7, 1995.
Patent Abstracts of Japan, JP 10-186202, Jul. 14, 1998.
Patent Abstracts of Japan, JP 2000-162693, Jun. 16, 2000.

*Primary Examiner*—Ricky Mack
(74) *Attorney, Agent, or Firm*—Oblon, Spivak, McClelland, Maier & Neustadt, P.C.

(57) ABSTRACT

An image pickup apparatus is disclosed which prevents interference of a lens barrel with an optical member and so forth with certainty and is advantageous in achievement of reduction in scale, weight and cost of the optical member and an adapter ring. If it is detected by a detection section that an adapter ring is attached to an adapter ring attachment portion, then a lens barrel control section moves a lens barrel so that a front end of the lens barrel is positioned within a range rearwardly of a front end of the adapter ring. Since the front end of the lens barrel does not project forwardly of the front end of the adapter ring, the end of the lens barrel does not interfere with a conversion lens or the like attached to the front end of the adapter ring. It is not necessary to form the wide conversion lens or the adapter ring with an increased size in order to prevent the front end of the lens barrel positioned at its projecting position from interfering with a lens of the wide conversion lens.

1 Claim, 7 Drawing Sheets

IMAGE PICKUP APPARATUS

BACKGROUND OF THE INVENTION

This invention relates to an image pickup apparatus.

Image pickup apparatus of the retractable barrel type are available wherein a lens barrel in which an image pickup optical system is accommodated is movable between a projecting position in which it projects forwardly of a casing and an accommodated position in which it is accommodated in the casing.

In some of conventional image pickup apparatus of the type described, in order to allow an optical member such as a conversion lens or a filter to be located forwardly of an image pickup optical system, an adapter ring formed in a cylindrical wall shape is removably attached to a threaded portion provided annularly on a front face of the casing such that it surrounds the lens barrel. The optical member is removably attached to a front end of the adapter ring. One of the image pickup apparatus of the type just described is disclosed, for example, in Japanese Patent No. 3174205 (hereinafter referred to as Patent Document 1).

Another one of the image pickup apparatus of the type described above is disclosed, for example, in Japanese Patent Laid-open No. Hei 10-48737 (hereinafter referred to as Patent Document 2). In the image pickup apparatus, an optical member including an adapter for three-dimensional image pickup is removably attached to a front end of a lens barrel, and a detection switch which exhibits an on state when the optical member is attached to the lens barrel is provided at a front end of the lens barrel. The image pickup apparatus records identification data on a film based on the operation of the detection switch.

In the image pickup apparatus of the Patent Document 1, the image pickup optical system is formed from a zoom lens, and the projection amount of the lens barrel varies in response to the zooming operation. Where it is taken into consideration to attach an optical member to the adapter ring, when the lens barrel is positioned at the most projecting position, the front end of the lens barrel must not interfere with the optical member attached to the adapter ring.

Therefore, in order to assure the distance between the optical member and the front end of the lens barrel, it is necessary to form the adapter ring and the optical member with great dimensions in the direction of the optical axis of them. Further, in order to prevent appearance of an eclipse with the image pickup optical system, also the dimension in a diametrical direction of the adapter ring and the optical member must be set great. Accordingly, the image pickup apparatus of the Patent Document 1 is disadvantageous in that increase in scale, weight and cost of the adapter ring and the optical member cannot be avoided.

Meanwhile, although the image pickup apparatus of the Patent Document 2 detects attachment of an optical member to the lens barrel and performs predetermined control, the Patent Document 2 is silent of interference of the front end of the retractable lens barrel with the optical member attached to the adapter ring.

SUMMARY OF THE INVENTION

It is an object of the present invention to provide an image pickup apparatus which prevents interference of a lens barrel with an optical member and so forth with certainty and is advantageous in achievement of reduction in scale, weight and cost of the optical member and an adapter ring.

According to an aspect of the present invention, there is provided an image pickup apparatus of a retractable lens barrel type, including:

a casing;

a lens barrel provided on the casing and having an image pickup optical system accommodated therein;

the lens barrel being movable between a projecting position in which the lens barrel projects most forwardly of the casing and an accommodated position in which the lens barrel is accommodated within the casing;

an annular adapter ring attachment portion provided on the casing in such a manner as to surround the lens barrel;

detection means for detecting that an adapter ring is attached to the adapter ring attachment portion; and lens barrel control means for controlling the projection amount of the lens barrel in response to a result of the detection of the detection means;

the control of the projection amount of the lens barrel by the lens barrel control means being performed within a range within which a front end of the lens barrel is positioned rearwardly of a front end of the adapter ring while the adapter ring is attached to the adapter ring attachment portion.

In the image pickup apparatus, if it is detected by the detection means that an adapter ring is attached to the adapter ring attachment portion, then the lens barrel control means moves the lens barrel so that the front end of the lens barrel is positioned rearwardly of the front end of the adapter ring. Accordingly, the front end of the lens barrel does not project forwardly of the front end of the adapter ring, and consequently, the end of the lens barrel never interferes with an optical member or the like attached to the front end of the adapter ring.

Consequently, with the image pickup apparatus, the lens barrel can be prevented from interfering with an optical member such as a conversion lens with certainty while reduction in scale, weight and cost of the optical member and the adapter ring can be achieved readily.

The above and other objects, features and advantages of the present invention will become apparent from the following description and the appended claims, taken in conjunction with the accompanying drawings in which like parts or elements denoted by like reference symbols.

DETAILED DESCRIPTION OF THE PREFERRED EMBODIMENTS

The preferred embodiments of the present invention will now be described in detail with reference to the accompanying drawings.

Figure 1:
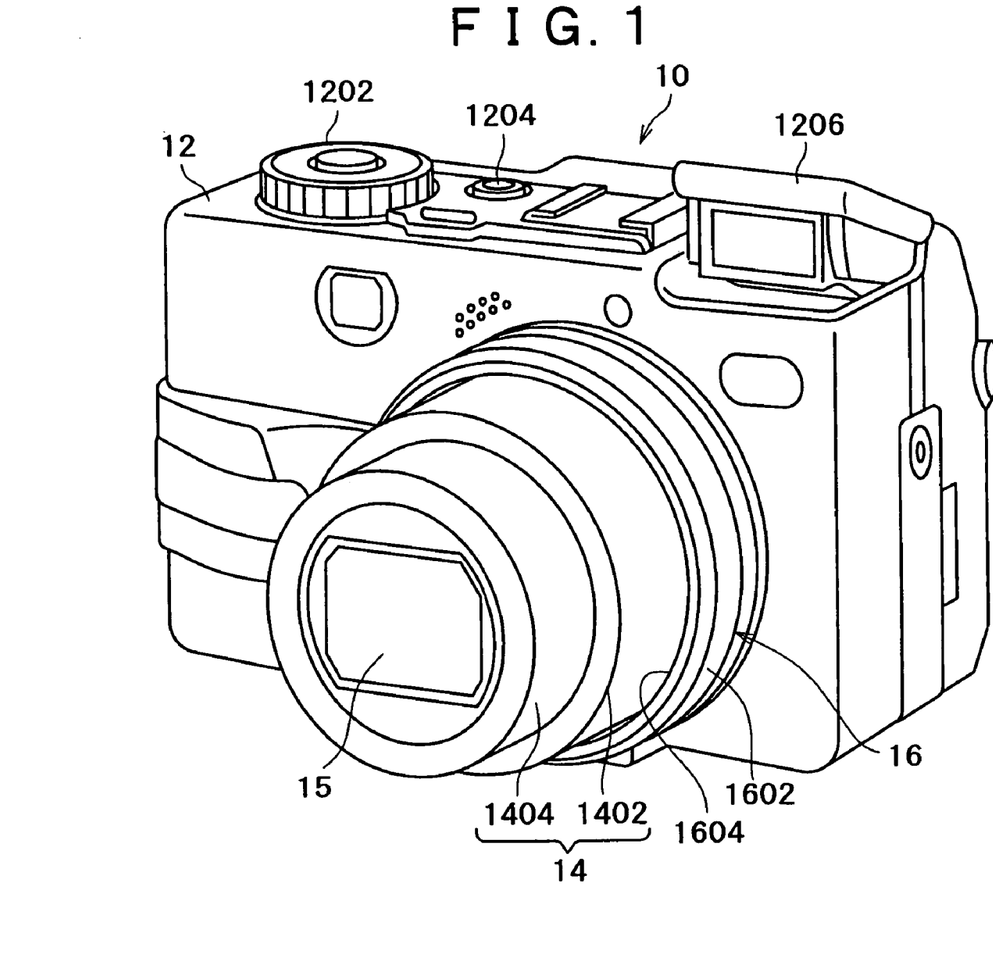
FIG. 1 is a perspective view of a digital still camera to which the present invention is applied as viewed from obliquely forwardly.
Figure 2:
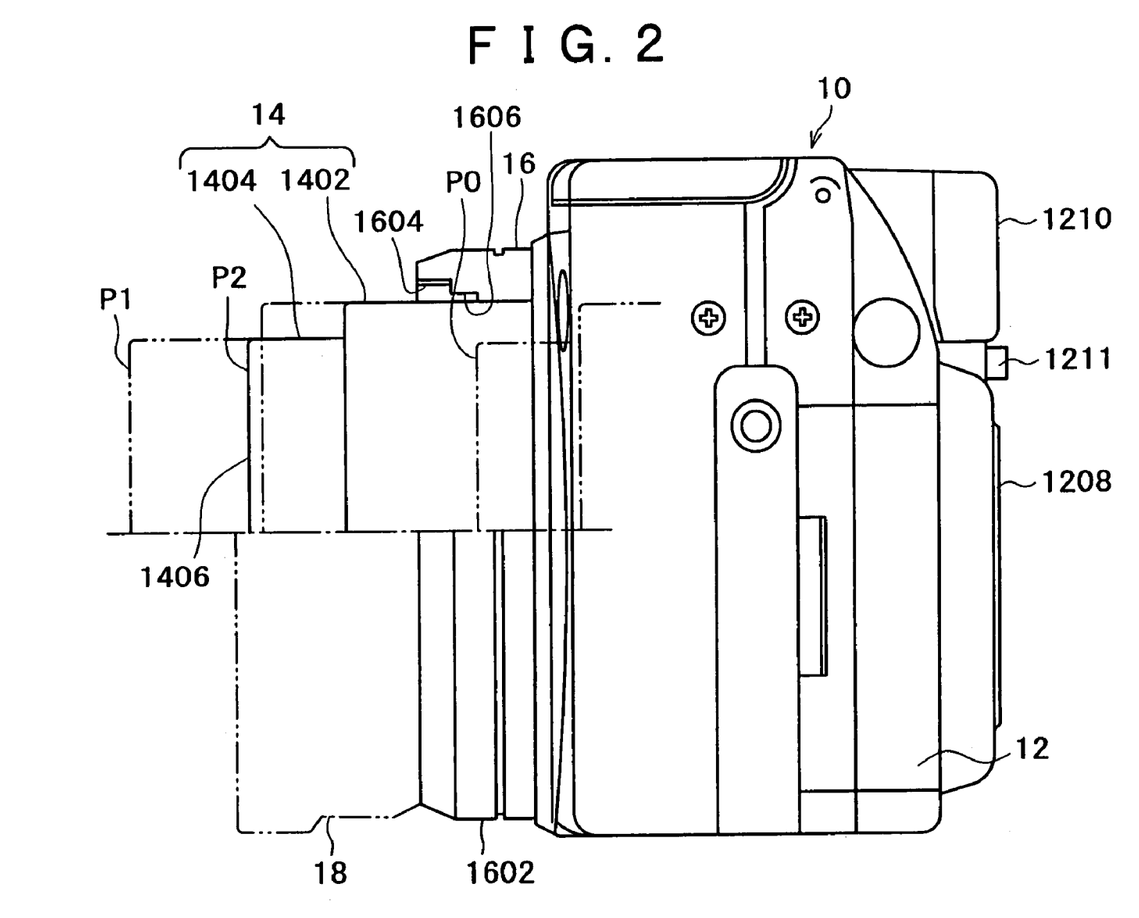
FIG. 2 is a side elevational view of the digital still camera of FIG. 1.
Figure 5:
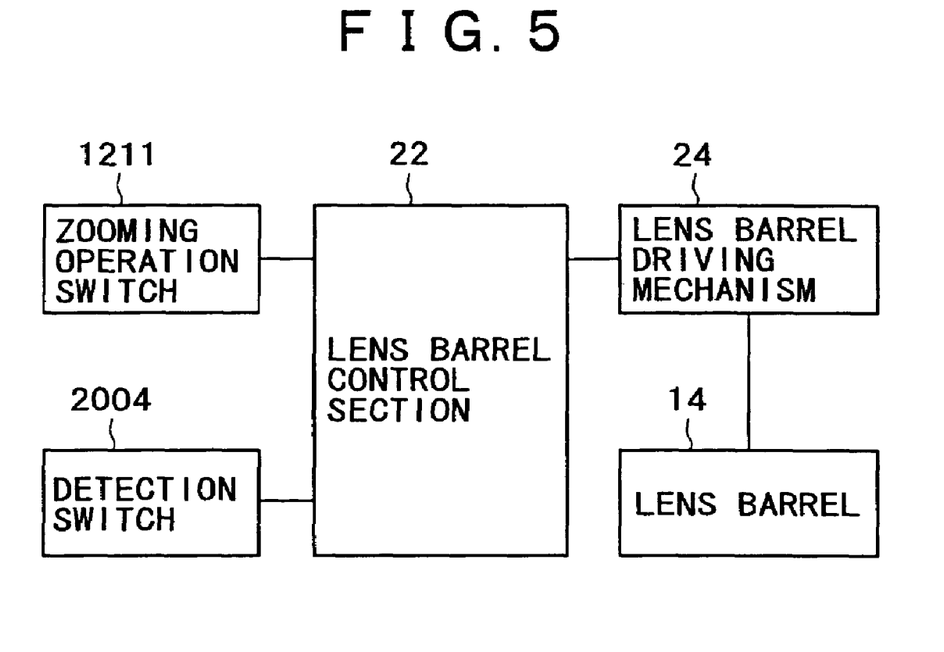
FIG. 5 is a block diagram showing a configuration of a control system for controlling a retraction movement of a lens barrel of the digital still camera of FIG. 1.

Referring first to FIGS. 1 and 2, there is shown a digital still camera to which the present invention is applied. The digital still camera 10 is an image pickup apparatus and includes a casing 12, a lens barrel 14, an adapter ring attachment portion 16, an adapter ring 18 (FIG. 3), a detection section 20 (FIG. 5), and a lens barrel control section 22 (FIG. 5).

Referring particularly to FIG. 1, a dial switch 1202 for changing over an image pickup mode, a shutter switch 1204 for triggering an image pickup operation and a flash apparatus 1206 for illuminating auxiliary light upon an image pickup subject are provided on an upper face of the casing 12.

Referring now to FIG. 2, a display apparatus 1208 which may be a liquid crystal display unit for displaying various data such as image data and character data, a finder window 1210 for visually observing an image pickup subject therethrough, a zooming operation switch 1211 for performing a zooming operation of an image pickup optical system 15, a power supply switch (not shown) and so forth are provided on a rear face of the casing 12.

Referring to FIGS. 1 and 2, the adapter ring attachment portion 16 is formed annularly such that it is swollen forwardly at a central portion of the front face of the casing 12. The lens barrel 14 is disposed on the inner side of the adapter ring attachment portion 16.

In the present embodiment, the lens barrel 14 is formed as a two-stage type lens barrel which includes a first lens barrel 1402 and a second lens barrel 1404 incorporated for relative movement on the inner side of the first lens barrel 1402 as seen in FIG. 2. The image pickup optical system 15 is accommodated in the lens barrels 1402 and 1404. An image pickup element (not shown) for picking up an image of an image pickup subject introduced by the image pickup optical system 15 to produce an image pickup signal is incorporated in the casing 12.

In the present embodiment, the image pickup optical system 15 is formed from a zoom lens, and the zooming ratio, that is, the image pickup magnification or the focal length, can be varied by moving a lens which forms the zoom lens in the direction of an optical axis of the zoom lens.

The lens barrel 14 is formed as of a so-called retractable type wherein it can be retracted by a lens barrel driving mechanism 24 (FIG. 5). The lens barrel 14 is configured such that the projection amount thereof varies in response to the zooming ratio of the image pickup optical system 15, and is movable between a projecting position P1 in which the image pickup optical system 15 is positioned at the most tele side position and the projection amount of the lens barrel 14 is maximum, and an accommodated position P0 in which the lens barrel 14 is accommodated in the casing 12. Further, where the image pickup optical system 15 is set to the most wide angle side, the lens barrel 14 is positioned at an intermediate position P2 which is a position between the projecting position P1 and the accommodated position P0 and forwardly of the adapter ring attachment portion 16.

Referring to FIG. 2, the adapter ring attachment portion 16 includes a cylindrical wall portion 1602 which surrounds an outer circumferential face of the lens barrel 14 with a space left therebetween, and a first female screw 1604 formed on an inner circumferential face of the cylindrical wall portion 1602.

An annular stepped portion 1606 (FIG. 4) is formed at a location of the inner circumferential face of the cylindrical wall portion 1602 rather near to the casing 12 such that it projects diametrically inwardly farther than the first female screw 1604.

Figure 3:
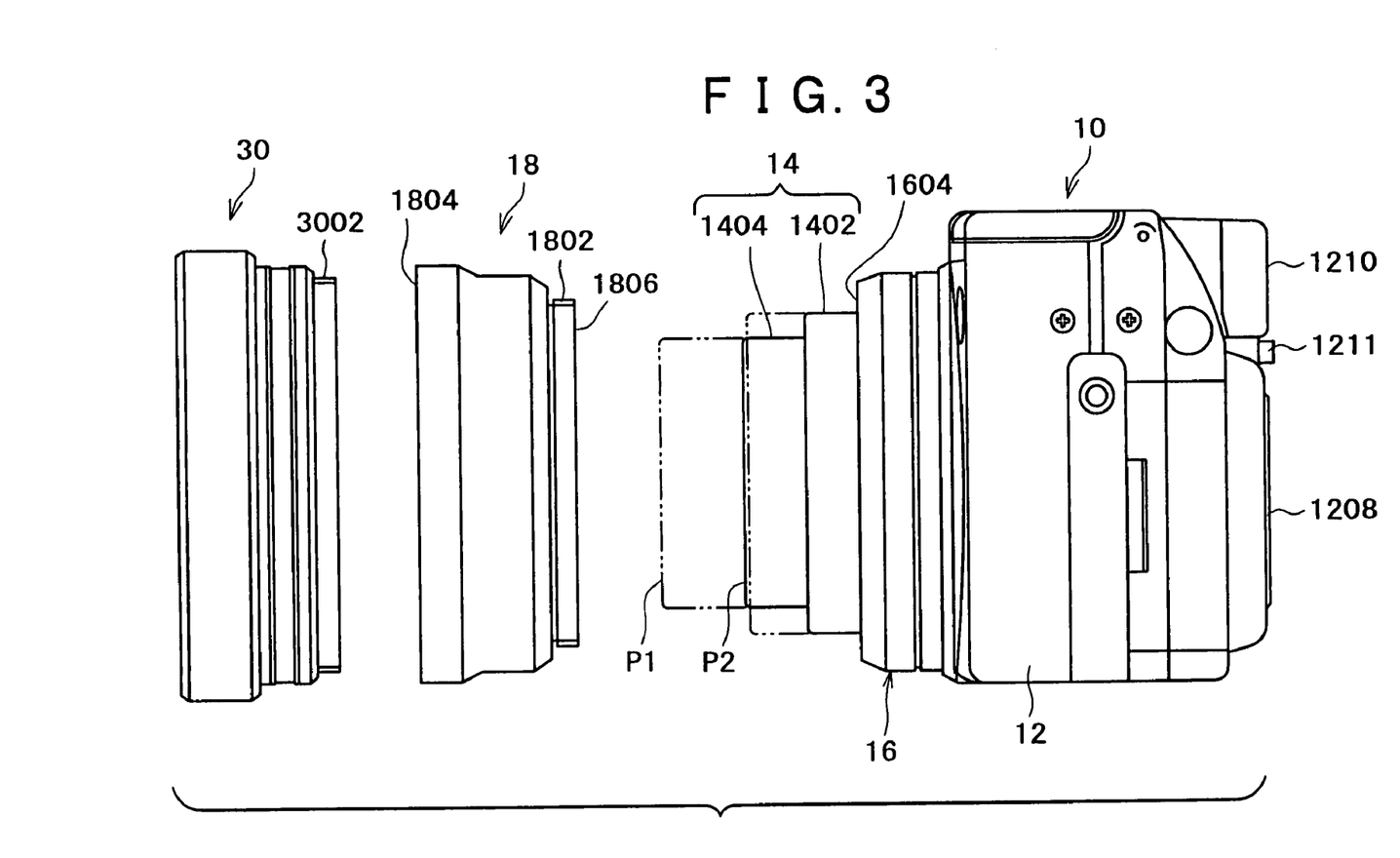
FIG. 3 is a side elevational view of the digital still camera of FIG. 1, an adapter ring and a wide conversion lens.
Figure 4:
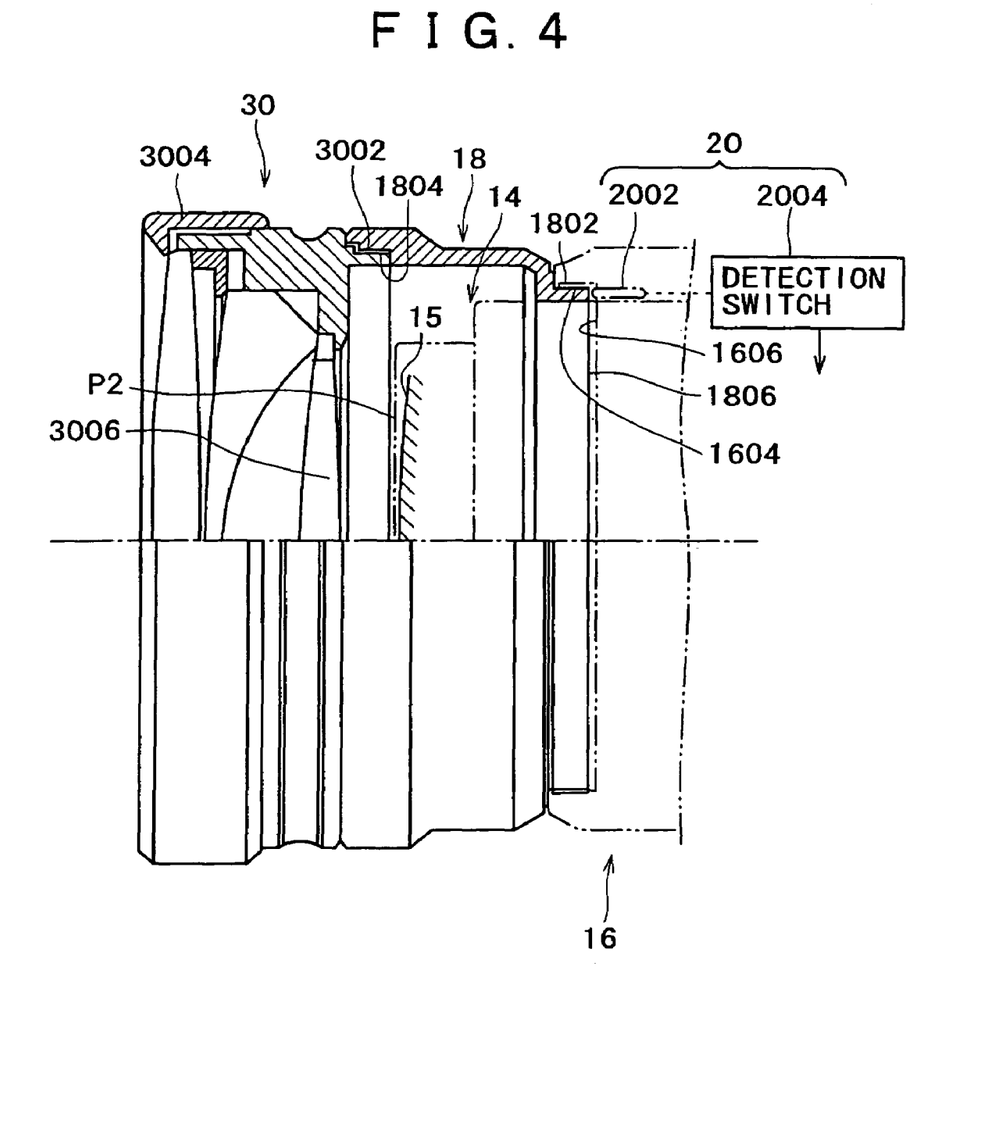
FIG. 4 is a sectional view of the adapter ring and the wide conversion lens shown in FIG. 2.

Referring to FIGS. 3 and 4, the adapter ring 18 is formed in a cylindrical wall shape having an inner diameter greater than the outer diameter of the lens barrel 14.

A first male screw 1802 (rear end attaching portion) for screwing engagement with the first female screw 1604 of the adapter ring attachment portion 16 is formed at a rear end portion of the adapter ring 18 such that the rear end portion of the adapter ring 18 is removably attached to the adapter ring attachment portion 16 by screwing the first male screw 1802 with the first female screw 1604.

A second female screw 1804 of an inner diameter greater than the outer diameter of the first male screw 1802 is formed at a front end portion of the adapter ring 18. The second female screw 1804 is formed so as to be screwed on a male screw 3002 of a wide conversion lens 30 as an optical member such that the front end portion of the adapter ring 18 is removably attached to the wide conversion lens 30 by screwing the second female screw 1804 with the male screw 3002. In the present embodiment, an optical member attachment portion is formed from the second female screw 1804. In the present embodiment, the first female screw 1604 and the first male screw 1802 are formed from double threaded screws while the second female screw 1804 is formed from a single threaded screw.

The adapter ring 18 is formed such that, where the rear end portion thereof is attached to the adapter ring attachment portion 16, the front end of the adapter ring 18 is positioned rearwardly of the projecting position P1 of the lens barrel 14.

Further, in the present embodiment, the adapter ring 18 is formed such that, where the rear end portion thereof is attached to the adapter ring attachment portion 16, the front end of the adapter ring 18 is positioned forwardly of the intermediate position P2 of the lens barrel 14.

Furthermore, in the present embodiment, the adapter ring 18 is formed such that, where the rear end portion thereof is attached to the adapter ring attachment portion 16 and the zooming ratio of the image pickup optical system 15 is set to the most wide angle side, no eclipse occurs with the image pickup optical system 15. Also the inner diameter of the second female screw 1804 at the front end portion of the adapter ring 18 is set to a value with which no eclipse occurs with the image pickup optical system 15.

Referring to FIG. 4, the wide conversion lens 30 has an optical system which includes one or more lenses 3006 for reducing, when it is attached to the adapter ring attachment portion 16 through the adapter ring 18, the focal length of the image pickup optical system 15 to change the zooming ratio (angle of view) to the wide angle side. In FIG. 4, reference numeral 3004 denotes a fancy ring.

The detection section 20 detects that the adapter ring 18 is attached to the adapter ring attachment portion 16. The detection section 20 includes a movable pin 2002 disposed on the stepped portion 1606 of the adapter ring attachment portion 16 and a detection switch 2004 for detecting a motion of the movable pin 2002.

The movable pin 2002 is provided for retraction movement on the stepped portion 1606 and is normally biased such that the front end thereof projects forwardly from the stepped portion 1606.

The detection switch 2004 detects a motion of the movable pin 2002 and outputs a detection signal in the form of an on/off signal to the lens barrel control section 22. In particular, if the adapter ring 18 is attached to the adapter ring attachment portion 16, then the movable pin 2002 is pushed by a rear end portion 1806 of the adapter ring 18 and moved from the projecting position to a retracted position, and the detection switch 2004 detects the motion of the movable pin 2002 and outputs a corresponding detection signal.

Referring to FIG. 5, the lens barrel control section 22 controls the lens barrel driving mechanism 24 based on a zooming operation signal supplied thereto from the zooming operation switch 1211 and a detection signal supplied thereto from the detection switch 2004 to control the projection amount of the lens barrel 14.

In particular, the lens barrel control section 22 controls the projection amount of the lens barrel 14 so that, when the power supply switch is turned off, the lens barrel 14 is positioned at the accommodated position P0, but when the power supply switch is turned on, the lens barrel 14 is positioned at the intermediate position P2.

The lens barrel control section 22 is formed from, for example, a microcomputer including a ROM for storing a control program, a RAM for providing a working area, an interface for controlling communication of a signal with the power supply switch, zooming operation switch 1211, detection switch 2004 and lens barrel driving mechanism 24, and a CPU for executing the control program of the ROM to execute a controlling operation.

Subsequently, operation when the digital still camera 10 is used to pick up an image is described.

First, operation when the digital still camera 10 is used solely, that is, when the digital still camera 10 is used without the adapter ring 18 or the wide conversion lens 30 attached thereto, is described.

When the power supply switch is in an off state, since the lens barrel 14 is positioned at the accommodated position P0 and accommodated within the casing 12, the lens barrel 14 is prevented from interfering with an article outside the casing 12 and being acted upon by excessive force.

As described hereinabove, the movable pin 2002 is biased to the position at which the front end portion thereof projects from the stepped portion 1606.

If the power supply switch is turned on, then a detection signal representing that the adapter ring 18 is not attached is supplied from the detection switch 2004 to the lens barrel control section 22. Consequently, the lens barrel control section 22 controls the lens barrel driving mechanism 24 to move the lens barrel 14 to the intermediate position P2 at which image pickup can be performed. In this state, the user would visually observe the finder window 1210 or the display apparatus 1208 and operate the zooming operation switch 1211 so that a desired zooming ratio may be obtained. In response to an operation signal of the zooming operation switch 1211 then, the lens barrel control section 22 controls the lens barrel driving mechanism 24 to move the lens barrel 14 between the intermediate position P2 and the projecting position P1.

Then, the user would depress the shutter switch 1204 to perform image pickup.

Now, operation when the digital still camera 10 is used with the adapter ring 18 and the wide conversion lens 30 attached thereto is described.

First, the male screw 3002 of the wide conversion lens 30 would be screwed into the second female screw 1804 of the adapter ring 18 to attach the wide conversion lens 30 to the front end portion of the adapter ring 18 as seen in FIG. 3.

Then, while the power supply switch of the digital still camera 10 is in an off state and the lens barrel 14 is positioned at the accommodated position P0, the first male screw 1802 of the adapter ring 18 would be screwed into the first female screw 1604 of the adapter ring attachment portion 16 as seen in FIG. 4. Consequently, the wide conversion lens 30 and the adapter ring 18 are attached to the adapter ring attachment portion 16.

In this instance, as the first male screw 1802 is screwed into the first female screw 1604, the rear end portion 1806 of the adapter ring 18 contacts with the front end of the movable pin 2002 to place and then keep the movable pin 2002 into and in the state retracted in the stepped portion 1606 as seen in FIG. 4.

Then, if the power supply switch is turned on, then a detection signal representing that the adapter ring 18 is attached is supplied from the detection switch 2004 to the lens barrel control section 22. Consequently, the lens barrel control section 22 controls the lens barrel driving mechanism 24 to move the lens barrel 14 so that the front end of the lens barrel 14 may be positioned within a range rearwardly of the front end of the adapter ring 18. In the present embodiment, the control of the projection amount of the lens barrel 14 by-the lens barrel control section 22 is performed so that the projection amount of the lens barrel 14 with which the zooming ratio of the image pickup optical system 15 exhibits the most wide angle side value may be obtained. Through the control of the projection amount, the lens barrel 14 is moved to the intermediate position P2, and then the position of the lens barrel 14 is fixed at the intermediate position P2 and a zooming movement is inhibited.

In particular, the projection amount of the lens barrel 14 by the lens barrel control section 22 is controlled within a range within which the front end of the lens barrel 14 is positioned rearwardly of the front end of the adapter ring 18 while the adapter ring 18 is attached to the adapter ring attachment portion 16. Accordingly, the front end of the lens barrel 14 does not interfere with the lens 3006 of the wide conversion lens 30.

Consequently, the zooming ratio of the image pickup optical system 15 is further changed to the wide angle side by an action of the optical system of the wide conversion lens 30.

Image pickup is performed by the user depressing the shutter switch 1204 while observing the finder window 1210 or the display apparatus 1208.

It is to be noted that, in the present embodiment, even if the zooming operation switch 1211 is operated in this state, since the lens barrel control section 22 inhibits a zooming operation, the position of the lens barrel 14 remains fixed at the intermediate position P2.

According to the digital still camera 10 having the configuration described above, since control of the projection amount of the lens barrel 14 by the lens barrel control section 22 is performed within the range within which the front end of the lens barrel 14 is positioned rearwardly of the front end of the adapter ring 18 while the adapter ring 18 is attached to the adapter ring attachment portion 16, the front end of the lens barrel 14 never interferes with such an optical member as the lens 3006 of the wide conversion lens 30 attached to the front end of the adapter ring 18.

Further, different from an alternative case wherein the front end of the lens barrel 14 positioned at the projecting position P1 is prevented from interfering with such an optical member as the wide conversion lens 30, there is no necessity to increase the dimensions in the direction of the optical axis and the diametrical direction of the optical member and the adapter ring 18.

Accordingly, while interference of the lens barrel 14 with the optical member is prevented with certainty, reduction in scale, weight and cost of the optical member and the adapter ring 18 can be achieved advantageously.

Further, since the optical member and the adapter ring 18 are reduced in scale in this manner, the digital still camera 10 is advantageous also in that handling of the digital still camera 10 in carrying or placing the same while the optical member and the adapter ring 18 are attached thereto is facilitated.

Further, in the present embodiment, the first female screw 1604 of the adapter ring attachment portion 16 and the first male screw 1802 of the adapter ring 18 are formed from double threaded screws while the second female screw 1804 of the adapter ring 18 is formed from a single threaded screw. Accordingly, even if the outer diameter of the male screw 3002 of the wide conversion lens 30 and the inner diameter of the first female screw 1604 of the adapter ring attachment portion 16 should be equal to each other, since the male screw 3002 of the wide conversion lens 30 is a single threaded screw and the first female screw 1604 is a double threaded screw, the male screw 3002 can be prevented from being screwed into the first female screw 1604 with certainty. Therefore, such a situation that the wide conversion lens 30 is attached directly to the adapter ring attachment portion 16 in error and the front end of the lens barrel 14 interferes with the lens 3006 of the wide conversion lens 30 can be prevented with certainty.

Further, if the pitch of the double threaded screws is set to equal to or less than ⅔ that of the single threaded screw, for example, with the former set to 0.4 and with the latter set to 0.75, then the pitch of the double threaded screws is much different from the pitch of the single threaded screw. This makes it further difficult to screw the single threaded screw with the double threaded screw, and the male screw 3002 can be prevented from being screwed into the first female screw 1604 with a higher degree of certainty.

Further, if the modules of the second female screw 1804 of the adapter ring 18 and the first female screw 1604 of the adapter ring attachment portion 16 are set to different values from each other such that, for example, the former is set to M46 and the latter is set to M45.5, then the male screw 3002 can be prevented from being screwed into the first female screw 1604 with a higher degree of certainty.

Further, if the outer diameter of the second female screw 1804 of the adapter ring 18 is set to a dimension equal to that of the outer diameter of a screw of a general filter or conversion lens and the outer diameter of the first female screw 1604 of the lens barrel 14 is set to a dimension different from the dimension of the outer diameter of the second female screw 1804 described above, then the male screw 3002 can be prevented from being screwed into the first female screw 1604 with a higher degree of certainty.

Further, even if the digital still camera 10 is used while the adapter ring 18 is attached to the adapter ring attachment portion 16 and no optical member is attached to the adapter ring 18, since the front end of the lens barrel 14 is positioned rearwardly of the front end of the adapter ring 18, the front end of the lens barrel 14 is protected by the adapter ring 18. Consequently, such a situation that some article collides with the front end of the lens barrel 14 to damage the lens barrel 14 or the lens barrel driving mechanism 24 can be prevented advantageously.

It is to be noted that, while, in the present embodiment, the lens barrel 14 is fixed at the intermediate position P2 to prevent a zooming operation while the adapter ring 18 is attached to the adapter ring attachment portion 16, only it is necessary to control the projection amount of the lens barrel 14 by means of the lens barrel control section 22 within the range within which the front end of the lens barrel 14 is positioned rearwardly of the front end of the adapter ring 18. Thus, the lens barrel 14 may be moved within the range to perform a zooming operation.

Now, a second embodiment of the present invention is described.

Figure 6:
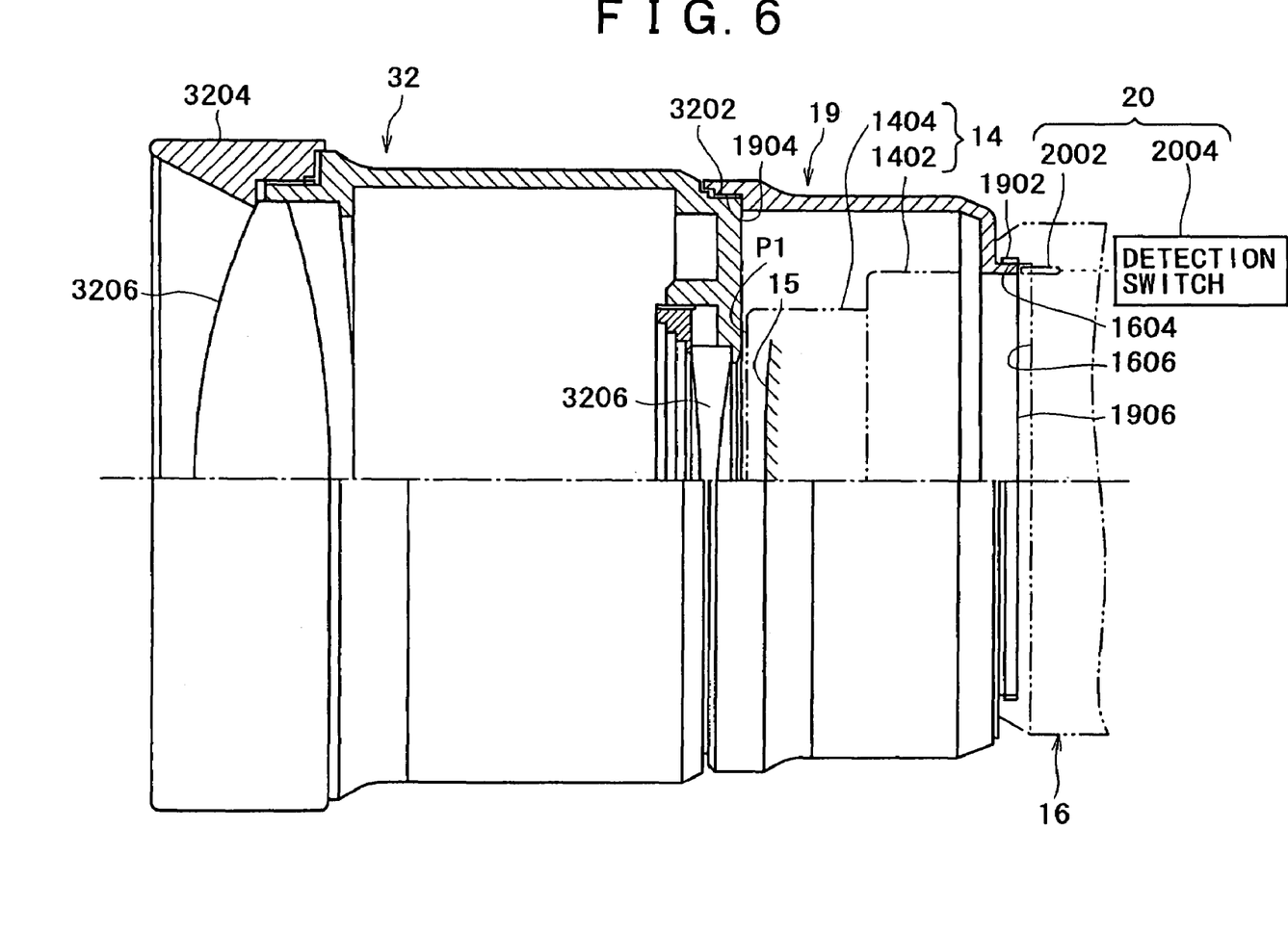
FIG. 6 is a sectional view of the adapter ring shown in FIG. 3 and a tele conversion lens.

FIG. 6 shows an adapter ring and a tele conversion lens of a digital camera as an image pickup apparatus according to the second embodiment of the present invention. The image pickup apparatus of the present embodiment is a modification to but is different from the image pickup apparatus of the first described above only. in the adapter ring and the tele conversion lens, and description is given below only of the different members.

Referring to FIG. 6, according to the second embodiment, a tele conversion lens 32 as a conversion lens and an adapter ring 19 for the tele conversion lens 32 are attached to the digital still camera 10.

The adapter ring 19 is formed in a cylindrical wall shape having an inner diameter greater than the outer diameter of the lens barrel 14.

A first male screw 1902 for being screwed into the first female screw 1604 of the adapter ring attachment portion 16 is formed at a rear end portion of the adapter ring 19 such that the rear end portion of the adapter ring 19 is removably attached to the adapter ring attachment portion 16 by screwing the first male screw 1902 into the first female screw 1604.

The adapter ring 19 is configured such that, where the rear end portion thereof is attached to the adapter ring attachment portion 16, the front end of the adapter ring 19 is positioned forwardly of the projecting position P1 of the lens barrel 14.

Further, even if the adapter ring 19 is attached to the adapter ring attachment portion 16, a rear end portion 1906 of the adapter ring 19 does not interfere with the movable pin 2002.

Accordingly, even if the adapter ring 19 is attached to the adapter ring attachment portion 16, the detection switch 2004 does not supply a detection signal indicating that the adapter ring 19 is attached to the lens barrel control section 22.

A second female screw 1904 having an inner diameter greater than the outer diameter of the first male screw 1902 is formed on a front end portion of the adapter ring 19. The second female screw 1904 is formed so as to be screwed with a male screw 3202 of the tele conversion lens 32 such that the tele conversion lens 32 is removably attached to the front end of the adapter ring 19 by screwing the second female screw 1904 and the male screw 3202 with each other. In the present embodiment, an optical member attachment portion is formed from the second female screw 1904. Further, in the present embodiment, the first female screw 1604 and the first male screw 1902 are formed from double threaded screws while the second female screw 1904 is formed from a single threaded screw.

The tele conversion lens 32 includes an optical system which in turn includes one or more lenses 3206 for extending, when it is attached to the adapter ring attachment portion 16 through the adapter ring 19, the focal length of the image pickup optical system 15 to change the zooming ratio (angle of view) to the tele side. In FIG. 6, reference numeral 3204 denotes a fancy ring.

Now, operation when the digital still camera 10 is used with the adapter ring 19 and the tele conversion lens 32 attached thereto is described.

First, the male screw 3202 of the tele conversion lens 32 would be screwed into the second female screw 1904 of the adapter ring 19 to attach the tele conversion lens 32 to the front end of the adapter ring 19 as seen in FIG. 6.

Then, while the power supply switch of the digital still camera 10 is in an off state and the lens barrel 14 is positioned at the accommodated position P0, the first male screw 1902 of the adapter ring 19 would be screwed into the first female screw 1604 of the adapter ring attachment portion 16. Consequently, the tele conversion lens 32 and the adapter ring 19 are attached to the adapter ring attachment portion 16.

Thereupon, even if the first male screw 1902 is screwed into the first female screw 1604, the rear end portion 1906 of the adapter ring 19 does not contact with the front end of the movable pin 2002.

Then, if the power supply switch is turned on, then a detection signal representing that the adapter ring 19 is attached is supplied from the detection switch 2004 to the lens barrel control section 22. Consequently, the lens barrel control section 22 performs a zooming operation of moving the lens barrel 14 between the intermediate position P2 and the projecting position P1 similarly as in the case wherein the digital still camera 10 is used solely.

Thereupon, even if the front end of the lens barrel 14 moves to the projecting position P1 while the adapter ring 19 is attached to the adapter ring attachment portion 16, since the front end of the adapter ring 19 is positioned forwardly of the projecting position P1 of the lens barrel 14, the front end of the lens barrel 14 does not interfere with the lens 3206 of the tele conversion lens 32.

Consequently, the zooming ratio of the image pickup. optical system 15 is further changed to the tele side by an action of the optical system of the tele conversion lens 32.

Image photograph is performed by the user depressing the shutter switch 1204 while visually observing the finder window 1210 or the display apparatus 1208.

According to the digital still camera 10 having the configuration described above, eve if the front end of the lens barrel 14 moves to the projecting position P1 while the adapter ring 19 is attached to the adapter ring attachment portion 16, since the front end of the adapter ring 19 is positioned forwardly of the projecting position P1 of the lens barrel 14, the front end of the lens barrel 14 does not interfere with the lens 3206 of the tele conversion lens 32 at all.

Accordingly, the lens barrel 14 can be prevented from interfering with the tele conversion lens 32 with certainty.

Also in the present embodiment, where the male screw 3202 of the tele conversion lens 32 and the first female screw 1604 are formed as a single threaded screw and a double threaded screw, respectively, or where the two screws are formed with different pitches from each other, with different modules from each other or with different diameters from each other, such a disadvantageous situation that the tele conversion lens 32 is attached directly to the adapter ring attachment portion 16 in error and the front end of the lens barrel 14 interferes with the lens 3206 of the tele conversion lens 32 can be prevented with certainty.

It is to be noted that, while, in the embodiments described above, the image pickup optical system 15 is formed from a zoom lens, naturally the present invention can be applied also where the image pickup optical system 15 has a fixed focal length or a fixed angle of view.

Further, while, in the embodiments described above, whether or not the adapter ring 18 is attached to the adapter ring attachment portion 16 is detected based on whether or not the movable pin 2002 of the detection section 20 is pushed and the lens barrel control section 22 controls the projection amount of the lens barrel 14 in response to a result of the detection, the embodiment may be modified in the following manner.

Figure 7:
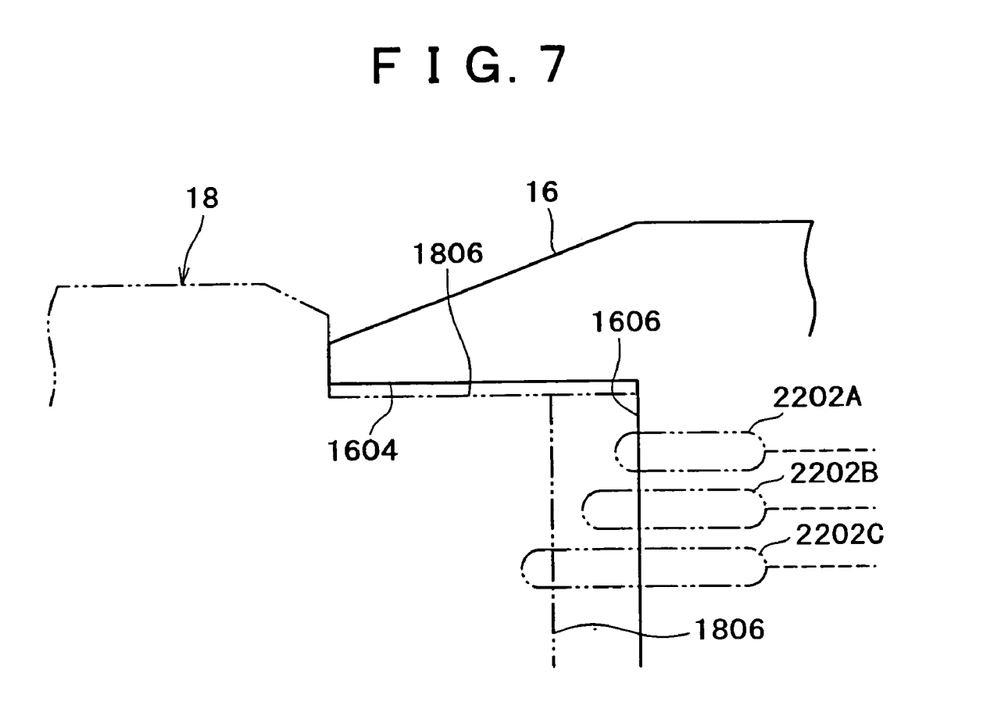
FIG. 7 is a schematic view showing a modified detection mechanism.

For example, as seen in FIG. 7, first, second and third movable pins 2202A, 2202B and 2202C are provided at the stepped portion 1606 of the adapter ring attachment portion 16 such that portions thereof projecting from the stepped portion 1606 have lengths different from one another, and different detection switches (not shown) from one another are provided corresponding to the first, second and third movable pins 2202A, 2202B and 2202C.

Three different first, second and third adapter rings are prepared for the adapter ring 18.

The first adapter ring 18 is dimensioned such that it pushes only the first movable pin 2202A when the first male screw 1806 is screwed in the first female screw 1604.

The second adapter ring 18 is dimensioned such that it pushes the two first and second movable pins 2202A and 2202B while the first male screw 1806 is screwed in the first female screw 1604.

The third adapter ring 18 is dimensioned such that it pushes all of the three first, second and third movable pins 2202A, 2202B and 2202C while the first male screw 1806 is screwed in the first female screw 1604.

Where the configuration just described is employed, which one of the first, second and third adapters is attached to the adapter ring attachment portion 16 can be discriminated based on the states of detection signals outputted from the detection switches. Thus, the projection amount of the lens barrel 14 can be controlled suitably for each of the adapter rings based on a result of the discrimination.

Accordingly, while conversion lenses having different magnifications from one another are attached to the first, second and third adapter rings and one of the adapter rings is attached to the adapter ring attachment portion 16, the projection amount of the lens barrel 14 can be controlled by the lens barrel control section 22 so that the front end of the lens barrel 14 may not interfere with the conversion lens.

It is to be noted that, while, in the embodiments described above, the image pickup apparatus of the present invention is formed as the digital still camera 10, naturally the present invention can be applied to various image pickup apparatus such as a video camera.

While preferred embodiments of the present invention have been described using specific terms, such description is for illustrative purposes only, and it is to be understood that changes and variations may be made without departing from the spirit or scope of the following claims.

What is claimed is:

1. A camera of a retractable lens barrel type, comprising:
   a casing;
   a lens barrel provided on said casing and having an image pickup optical system accommodated therein;
   said lens barrel being movable between a projecting position in which said lens barrel projects most forwardly of said casing and an accommodated position in which said lens barrel is accommodated within said casing;

an annular adapter ring attachment portion provided on said casing in such a manner as to surround said lens barrel;
detection means for detecting that an adapter ring is attached to said adapter ring attachment portion; and
lens barrel control means for controlling the projection amount of said lens barrel in response to a result of the detection of said detection means;
the control of the projection amount of said lens barrel by said lens barrel control means being performed within a range within which a front end of said lens barrel is positioned rearwardly of a front end of the adapter ring while the adapter ring is attached to said adapter ring attachment portion; and
a liquid crystal display unit for displaying image data and character data, a finder window for visually observing an image pickup subject, a zooming operation switch for performing a zooming operation, and a power supply switch, each provided on a rear face of the casing.

* * * * *